United States Patent [19]
Karlsson

[11] Patent Number: 5,542,029
[45] Date of Patent: Jul. 30, 1996

[54] SYSTEM AND METHOD FOR HALFTONING USING AN OVERLAPPING THRESHOLD ARRAY

[75] Inventor: Magnus L. Karlsson, Milpitas, Calif.

[73] Assignee: Apple Computer, Inc., Cupertino, Calif.

[21] Appl. No.: 129,998

[22] Filed: Sep. 30, 1993

[51] Int. Cl.$^6$ .................................................. G06K 15/00
[52] U.S. Cl. ........................... 395/109; 358/456; 358/298
[58] Field of Search .................................... 395/109, 101; 358/466, 298, 534, 536, 456, 465

[56]  References Cited

U.S. PATENT DOCUMENTS

| | | | |
|---|---|---|---|
| 5,124,803 | 6/1992 | Troxel | 358/456 |
| 5,150,428 | 9/1992 | Leone et al. | 358/455 |
| 5,267,054 | 11/1993 | Chang et al. | 358/456 |
| 5,285,291 | 2/1994 | Schiller | 358/453 |
| 5,305,118 | 4/1994 | Schiller et al. | 358/456 |

FOREIGN PATENT DOCUMENTS

| | | |
|---|---|---|
| 0293214 | 11/1988 | European Pat. Off. . |
| 0451995 | 10/1991 | European Pat. Off. . |
| 0464650 | 1/1992 | European Pat. Off. . |
| 0520774 | 12/1992 | European Pat. Off. . |
| 2397112 | 11/1979 | France . |
| 9113512 | 9/1991 | WIPO . |

OTHER PUBLICATIONS

Fink, Peter, "PostScript Screening—Adobe Accurate Screens," 1992, pp. 309–318.
Abode Systems, Inc., "Postscript Language Reference Manual," 1990, pp. 15–98.

Primary Examiner—Mark R. Powell
Assistant Examiner—Tracy M. Lagree
Attorney, Agent, or Firm—Greg T. Sueoka

[57]  ABSTRACT

The system and method disclosed herein relates to digital halftoning where a threshold array is used to control individual pixels in a halftone cell. The threshold array is replicated to tile the entire device space so that each pixel in device space is mapped to a particular location in the threshold array. By tiling the threshold array with overlap, the size of the overall threshold array is reduced. A CPU interface couples a FIFO buffer, registers, and RAM to a CPU for receiving pixel data, control signals and other values, respectively. An engine control unit is coupled to control a video processing unit and an output device for producing halftone images with a halftone matrix of reduced size. The engine control unit controls threshold logic that applies the threshold matrix to the pixel data to produce the data stream sent to the output device. The method of the present invention preferably comprises the steps of: defining a halftone cell and a minimal threshold array; mapping the threshold array over device space; determining a row and a column in the threshold array for the previous pixel of the image that has been rendered to device space; determining whether the next pixel is vertically adjacent or horizontally adjacent to the pixel that was previously mapped to device space; determining whether the next pixel is within the threshold array used for the previous pixel; and adjusting the mapping to account for overlapping threshold arrays if the next pixel is not within the threshold array used for the previous pixel.

20 Claims, 5 Drawing Sheets

SYSTEM AND METHOD FOR HALFTONING USING AN OVERLAPPING THRESHOLD ARRAY

BACKGROUND OF THE INVENTION

1. Field of the Invention

The present invention relates generally to the field of reproducing images with limited tone reproduction capacity, where intermediate tones are represented by halftones, generally for computer graphics applications and the like. More particularly, the present invention relates to digital halftoning where a threshold array is used to control individual pixels in a halftone cell, and most particularly, to an implementation for halftoning using an overlapping threshold array such that the size of the threshold array is reduced.

2. Description of Related Art

When reproducing images in computer graphics, it is seldom possible to duplicate the values of the original scene. However, to create a believable image, a believable tonal representation is all that is required. The human eye and brain help by compensating for differences in illumination, tonal range and color surroundings. There exist two general categories of imaging systems, namely, those that reproduce acceptable tone directly and those that are not able to do so. The first category of imaging systems includes systems capable of rendering images having continuous tone. Among these are photography, television, and certain digital computer displays of sufficient tonal resolution. Such systems typically do not require halftones because the reproduction of tone depends on the linearity of the system, the limits with which it produces white and black, and the ambient light during viewing.

The second category of imaging systems includes systems with limited tone reproduction capacity. These are often binary devices, which can reproduce only two values corresponding to "on" and "off." In such binary systems, such as monochrome computer displays and commercial printing presses, intermediate tones must be represented by halftones. Such halftoning systems rely on the eye and brain to integrate numerous small features to achieve the impression of tone.

Halftoning is the process by which continuous-tone colors are approximated by a pattern of pixels that can achieve only a limited number of discrete colors. The most familiar case of this is the rendering of gray tones with black and white-pixels, as in a newspaper photograph. Generally, when halftoning is required, it occurs after all color components have been transformed by an appropriate transfer function.

A halftone pattern is made up of a region of pixels referred to as the halftone cell. The halftone cell contains a specific, repeatable pattern. The tonal resolution of a halftone pattern depends on the number of pixels in the halftone cell. Within any given halftone cell in an image, a certain percentage of the pixels may be "on" and the remaining pixels may be "off." The percentage of pixels that are on correspond to the tonal value that the cell represents. For example, if sixty percent of the pixels in a given cell are black and the rest are white, that cell emulates an ideal sixty percent gray tint.

At any given addressability (i.e., the number of pixels that can be addressed in an image), there is a trade-off between cell size and tonal resolution: the smaller the cell, the smaller the number of pixels it contains, and the fewer tonal values it can represent. Thus, for the best tonal resolution (i.e., the most gray levels), the halftone cell should be large so as to include as many pixels as possible. On the other hand, the bigger the cell, the more visible it becomes to the human eye, thereby sometimes distorting the picture. This tradeoff between gray levels and cell size is one of the classic problems of digital halftoning.

In conventional digital halftoning (using rational tangents), a threshold array is used to directly control the individual pixels in a halftone cell. A threshold array is much like a sampled image, because it is a rectangular array of pixel values. However, it is defined entirely in device space, and the sampled values typically occupy 8 bits each. Each pixel or element within the cell is assigned a threshold value, which represents the tonal value at which the pixel is turned on. The pixel values nominally represent gray levels, where the value 0 may be black and the value 255 may be white. When deciding whether to turn the pixel on, an imaging system checks the pixel's location in the halftone image, determines the tonal value of the image at that exact location, and compares this tonal value with the pixel's threshold value in the threshold array. If the tonal value exceeds the threshold value, the pixel is turned on when the image is created by the imaging system.

The threshold array is then replicated and tiled (i.e., filled) over the entire device space. Each pixel of device space is mapped to a particular element of the threshold array.

Figure 1A:
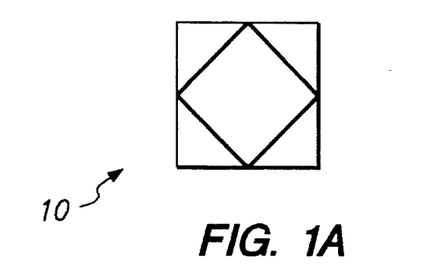
FIG. 1A illustrates a graphic representation of a 45 degree screen implemented by tiling two halftone cells within a threshold array.

The threshold array defined in this way may contain data for one or multiple halftone cells. Moreover, the size of the threshold array can vary greatly. The reason for this is that a specific screen angle is implemented by tiling multiple halftone cells within the threshold array such that when the threshold array is tiled over a large area, it will produce the desired pattern of halftone cells. In other words, the threshold array must provide elements at its right edge that are in alignment with elements at its left edge such that when two threshold arrays are tiled by placing them adjacent to each other, the halftone cells between the arrays (over an edge of the threshold array) are identical to the cells within the array. Similarly, the same must be true in the vertical direction. For example, a 45 degree screen is implemented by tiling two halftone cells within the threshold array, as illustrated at 10 in FIG. 1A. By tiling the threshold array over a large area, a pattern of halftone cells is produced, as illustrated at 12 in FIG. 1B.

The size of the threshold array is directly determined by the rational tangent coefficients for the screen (i.e., the number of steps to the right and up in device space between one pixel in a halftone cell and the same pixel in a neighboring halftone cell). For example, a 45 degree screen with 600 dpi (dots per inch) and 106 lines, produced by replicating the halftone cell 4 steps to the right and 4 steps up, has 4, 4 as rational tangents coefficients. The size of the smallest threshold array (i.e., the size of the threshold array in pixels) required to correctly produce the halftone cell pattern, when tiled, is determined by the following equation:

$$n*A+m*B,$$

where A and B are the rational tangent coefficients and n and m are least common denominators such that:

$$n/m=A/B.$$

For the exemplary 45 degree screen with 106 lines, A=B=4 and n=m=1. The smallest threshold array required to produce the halftone screen has 8 by 8 elements (1*4+1*4=8).

Figure 1B:
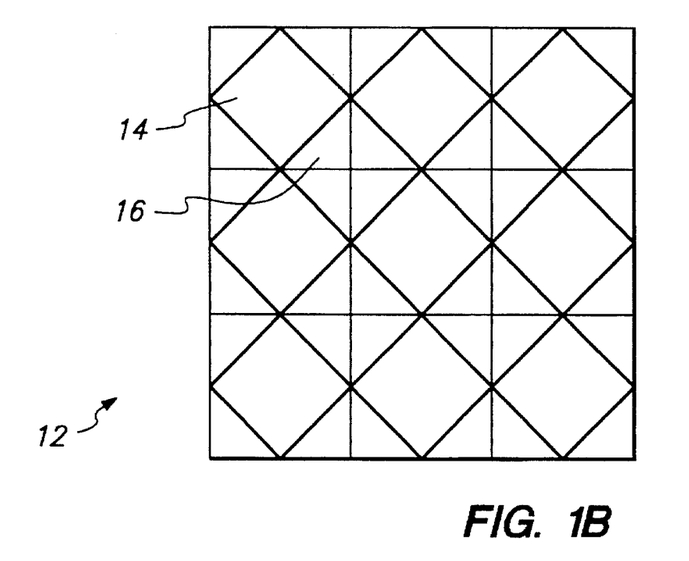
FIG. 1B illustrates a graphic representation of a pattern of halftone cells generated by tiling the threshold array of FIG. 1A.

As shown in FIG. 1B, the threshold array size need only be 8 elements by 8 elements since at 45 degrees, the left and right edges match, as do the top and bottom edges. Therefore, the halftone cell 14 within the threshold array will be identical to the halftone cell 16 covering four threshold arrays.

One problem which surfaces with this method lies in the rapidly increasing size of the threshold array when n and m increase. This typically occurs in instances when the screen angle is small (i.e., close to 0 degrees), or when the screen angle is large (i.e., close to 90 degrees), or when the screen angle is a close approximation of an irrational tangent. This is especially important when the halftoning method is implemented in hardware, where the size of the threshold array directly translates to silicon area, and directly affects cost and manufacturability. In comparison, a screen with rational tangents of 4, 3 only requires 7 by 7 elements to create the halftone cell. However, the threshold array must be 25 by 25 elements such that the threshold array can be tiled with the right, left and top, bottom edges in alignment.

For example, a halftone screen with rational tangent coefficients of 4, 5 will require a 41 by 41 element threshold array, compared to the 8 by 8 element threshold array needed for the 45 degree halftone screen mentioned above. As another example, a 15 degree screen having 600 dpi and 106 lines may be approximated using a 2 by 2 super-cell with rational tangent coefficients of 11, 3. This generates a 105.25 line, 15.25 degree screen. The threshold array required to tile this super-cell has 130 by 130 elements (11*11+3*3=130), for a total storage size of 16,900 bytes.

Hence, because the size of a threshold array can grow drastically for small and large degree screens, large amounts of storage capacity are required in computer graphics systems where any degree screen may be specified. In smaller computer systems, a large storage capacity may be impractical. Additionally, large memory requirements dedicated to this purpose reduce available memory for other operations. Further, excessive memory results in additional cost and space considerations for hardware dedicated to halftoning. Thus, there is an ongoing need for an improved implementation of halftoning offering less expensive alternatives.

SUMMARY OF THE INVENTION

The present invention is directed to a system and method relating to digital halftoning techniques where a threshold array is used to control individual pixels in a halftone cell. The threshold array is replicated to tile the entire device space so that each pixel in device space is mapped to a particular location in the threshold array. By tiling the threshold array with overlap, the size of the overall threshold array is reduced. The preferred embodiment of a system for halftoning using an overlapping threshold array comprises: a central processing unit (CPU), an output device, random access memory, read only memory, and an input port. These components are coupled by a CPU bus. The system of the present invention further comprises: a video processing unit, a FIFO (first in first out) buffer, a CPU interface unit, a plurality of registers, random access memory, and an engine control unit. The CPU interface couples the FIFO buffer, the plurality of registers, and the RAM to the CPU for receiving pixel data, control signals, and other values, respectively. The engine control unit is coupled to control the video processing unit and the output device for producing halftone images with a threshold matrix of reduced size. In particular, the engine control unit controls threshold logic in the video processing unit that applies the threshold matrix to the pixel data to produce the data stream sent to the output device.

The method of the present invention preferably comprises the steps of: defining a halftone cell and a minimal threshold array; mapping the threshold array over device space; determining a row and a column in the threshold array for the previous pixel of the image that has been rendered to device space; determining whether the next pixel is vertically adjacent or horizontally adjacent to the pixel that was previously mapped to device space; determining whether the next pixel is within the threshold array used for the previous pixel; and adjusting the mapping to account for overlapping threshold arrays if the next pixel is not within the threshold array used for the previous pixel.

The features of the present invention will become apparent from the detailed description which follows, considered together with the appended drawings.

BRIEF DESCRIPTION OF THE DRAWINGS

A preferred embodiment of the system and method of the present invention is illustrated in and by the following drawings in which like reference numerals indicate like parts and in which.

DETAILED DESCRIPTION OF THE PREFERRED EMBODIMENTS

Figure 2:
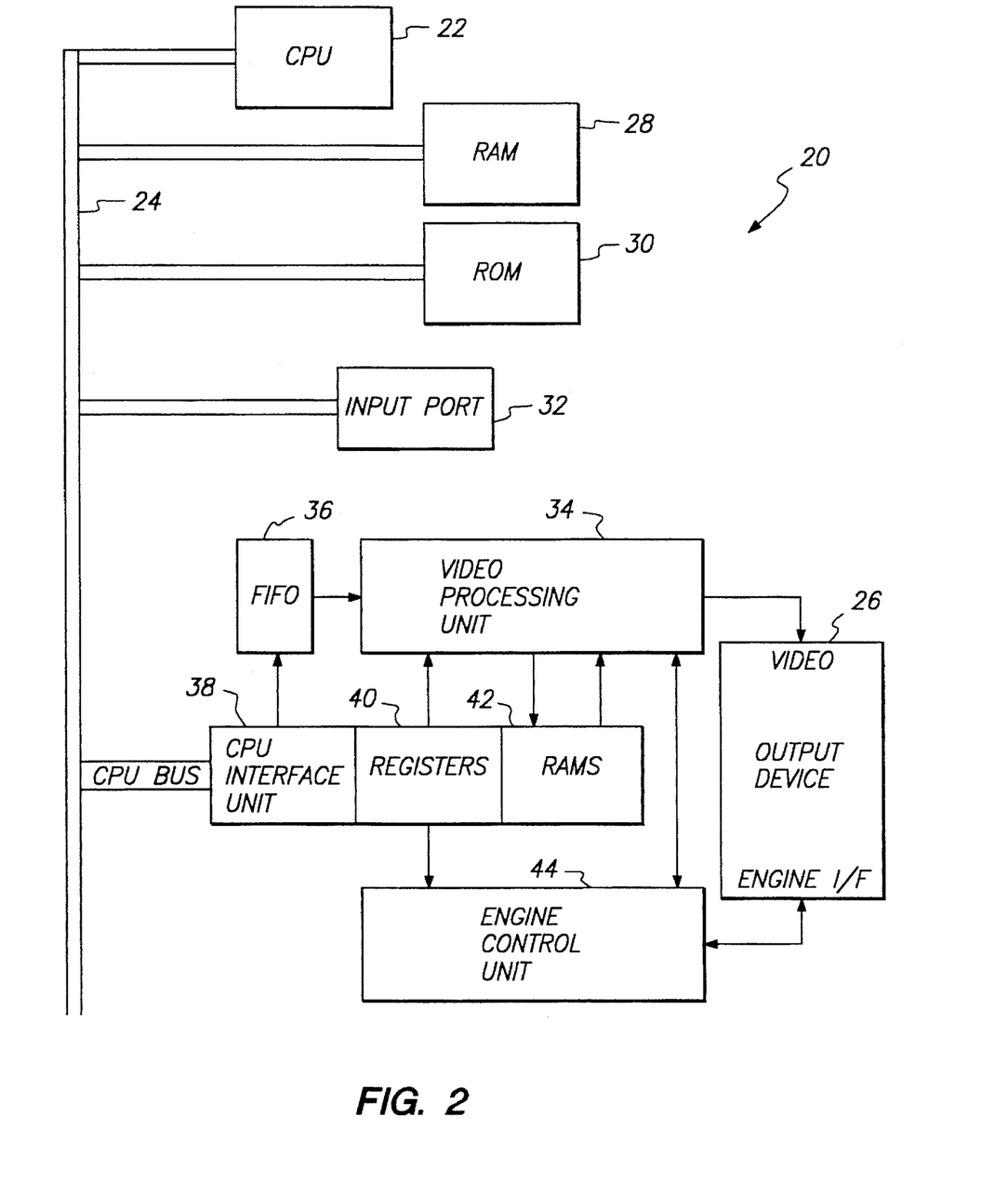
FIG. 2 is a block diagram of a preferred embodiment for the system for halftoning using an overlapping threshold array.

FIG. 2 illustrates a typical microprocessor-based system 20 for generating digital representations of images or the like in accordance with one embodiment of the present invention. The system 20 of the present invention preferably comprises a central processing unit (CPU) 22, a bus 24, an output device 26, random access memory 28, read only memory 30, an input port 32 and a video processing unit 34. The microprocessor or CPU 22 is connected to the CPU bus 24. The system 20 typically comprises an output device 26, for example, a printer. The output device 26 is used to print the images generated by the system and method of the present invention. Such an output device 26 may take the form of any of several varieties of print engines. The system 20 of the present invention receives data from another system via the input port 32 and converts the data into an image and control signals to drive the output device 26.

Also shown, as part of the computer system 20, is random access memory (RAM) 28 and read only memory (ROM) 30. The ROM 30 typically contains program instructions (software) for execution by the central processing unit 22 in all general as well as special purpose computers. In fact, the elements contained within the system 20 are intended to be representative of machines manufactured by Apple Computer Co., Cupertino, Calif. Other computers having similar capabilities may also be adapted to perform the operations described below.

Also illustrated in FIG. 2 is an input port 32, typically an input/output device. It should be understood, however, that the input port 32 may be a serial port, a parallel port or an ethernet port.

Input to the output device 26 is provided by a video processing unit 34. The video processing unit 34 generates a video destination bit map for display on the video 26. Each bit in the destination bit map corresponds to a pixel on the video. Thus, the destination bit map can be described as a two dimensional array of points having known coordinates.

The preferred embodiment of the system further comprises a FIFO (first in first out) buffer 36, a CPU interface unit 38, a plurality of registers 40, random access memory 42, and an engine control unit 44. These components 34, 36, 38, 40, 42 and 44 are coupled between the CPU bus 24, and the output device 26. In a preferred embodiment these components are constructed on an application specific integrated circuit (ASIC).

The CPU interface unit 38 is connected to the bus 24 and used by the CPU 22 for sending and receiving data to/from the components 36, 40, 42 and 44 coupled between the CPU bus 24 and the output device 26. The CPU interface unit 38 provides for access to the CPU bus 24. The CPU interface unit 38 also routes data to the FIFO buffer 36, the registers 40 and the RAM 42 as needed.

The FIFO buffer 36 is used to store pixel data that is converted to the data stream used for each pixel forming the image. The input of the FIFO buffer 36 is coupled to receive data from the memory 28 via the CPU interface unit 38. The output of the FIFO buffer 36 is coupled to the video processing unit 34.

The CPU interface 38 is also coupled to the registers 40 and RAM 42 for storing control signals, masking values, color variance values, a threshold matrix and video modulation values. These values are used by the video processing unit 34 to apply the values to the pixel data input from the FIFO buffer 36 for affecting the various properties of printing as understood to those skilled in the art. The registers 40 are preferably used for storing control signals. The registers 40 have outputs coupled to the video processing unit 34 and the engine control unit 44 for providing the control signals that have been stored there by the CPU 22. The RAM 42 preferably stores a threshold matrix received from the CPU 22. As will be discussed in more detail below, the threshold matrix is preferably of minimum size to map one full halftone cell. The threshold matrix, of course, also comprises portions of other adjacent halftone cells to make the threshold matrix rectangular, but in any event, the threshold matrix will contain at least one full halftone cell.

The engine control unit 44 is preferably coupled to the plurality of registers 40 to receive control signals from the CPU 22. The engine control unit 44 is also coupled to the video processing unit 34 to provide additional control signals for application of the values stored in RAM 42, and in particular, the halftoning process. The engine control unit 44 is also coupled to the output device 26 to control and communicate during the rendering of the image by the print engine 26.

The final element of the halftoning system of the present invention is the video processing unit 34. The video processing unit 34 is preferably coupled to the FIFO buffer 36 to receive the data forming the image to be printed. The video processing unit 34 is coupled to the registers 40 to receive control signals for controlling the operation of the video processing unit 34. The video processing unit 34 is also coupled to the RAM 42 to receive values to apply to the pixels forming the image. Included within these values are the values for the threshold matrix used in halftoning. The video processing unit 34 also communicates with and receives commands from the engine control unit 44. The output of the video processing unit 34 is coupled to the video input of the output device 26 for providing the data that will be used to construct the image by the printer engine 26. Still more particularly, the video processing unit 34 includes threshold logic for using the threshold matrix stored in the RAM 42 and applying it to the incoming data stream provided by the FIFO buffer 36. Included within the threshold logic is logic for correctly overlapping the threshold matrix as will be described in more detail below. The overlapping of the threshold matrix (threshold array) is effectively done by adjusting the addresses used to access the threshold matrix with a more complicated addressing scheme disclosed below to account for transitions at the edges of the threshold matrix when rendering a next pixel.

Having described the general system configuration of the present invention, the specific process and operations of the system 20 are described in further detail. Although the present invention has been and will be described with reference to FIGS. 2–8, it should be understood that the figures are for illustration only and should not be taken as limitations upon the invention. It is contemplated that many changes and modifications may be made, by one of ordinary skill in the art, to the process and arrangement of steps of the process of the invention without departing from the spirit and scope of the invention as disclosed herein.

The present invention relates to a system and method using overlapping threshold arrays in order to achieve the same result of screen representation achieved by conventional halftoning, but by using a much smaller threshold array. The inventive method uses the smallest possible threshold array required to define one halftone cell, and then maps this threshold array over the entire device space such that it produces the correct halftone pattern. This may be achieved by "tiling" the threshold array with overlap.

Figure 3:
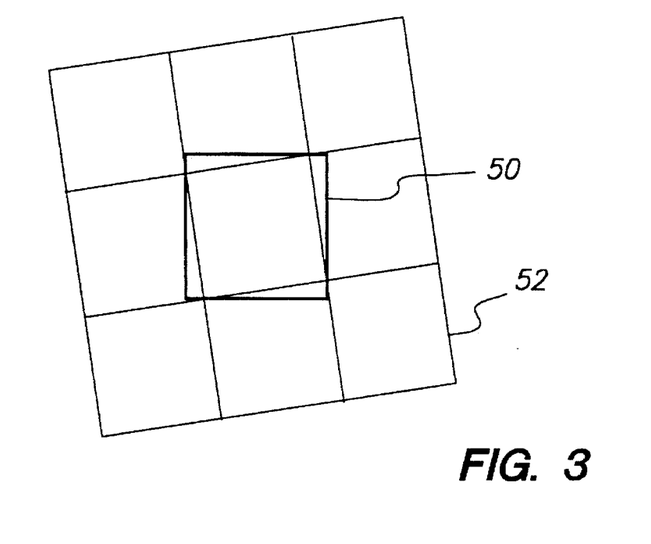
FIG. 3 illustrates an overlapping threshold array cut out of a device space containing a tiled halftone pattern.

The threshold array required to produce the correct halftone pattern using overlap may be defined by cutting out one threshold array from a device space tiled with the desired halftone pattern. This is best illustrated in FIG. 3, where a threshold array 50 is cut out of a device space containing a tiled halftone pattern 52. The threshold array 50 defined in this way has a side equal to the sum of the rational tangent coefficients for the halftone screen. Unlike the normal threshold array, which by definition contains an integer number of halftone cells, this type of threshold array contains one complete halftone cell plus parts of neighboring halftone cells, for a total area of up to two halftone cells. The threshold array area is the largest for 45 degree screens.

Figures 4, 5, 6, 7:
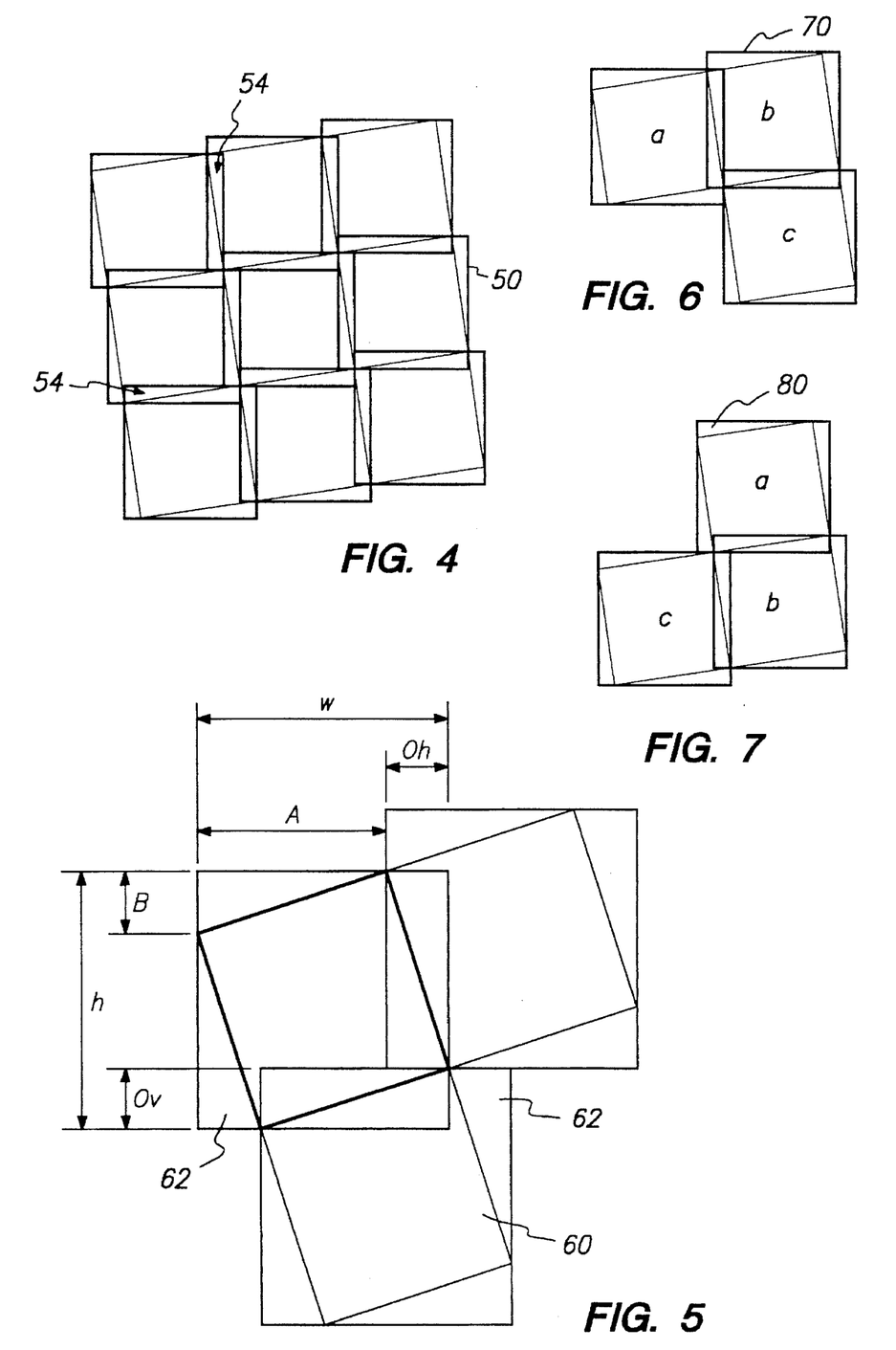
FIG. 4 illustrates a representation of a halftone pattern produced by tiling an overlapping threshold array over the device space with an overlap.
FIG. 5 is an illustration of the overlapping threshold array with respect to a tiled screen, indicating the dimensions involved.
FIG. 6 is a graphic representation of exemplary tiles a, b and c during mapping of a next horizontal device pixel in an overlapping threshold array.
FIG. 7 is a graphic representation of exemplary tiles a, b and c during mapping of a starting device pixel for a next row in an overlapping threshold array.

The halftone pattern is generated by "tiling" the threshold array 50 over the device space with overlap. This is best illustrated in FIG. 4. The threshold array 50 is replicated over the device space, but with an overlap, indicated at 54 in FIG. 4.

The reduction in the size of the threshold array using this technique is illustrated by using the exemplary screens discussed above. The 45 degree screen, in rational tangent coefficients of 4, 4, requires the same 8 by 8 element threshold array (4+4=8) as required by conventional digital halftoning techniques. However, a screen with 4, 5 as coefficients requires a 9 by 9 element threshold array (4+5= 9), as compared to the 41 by 41 elements required with a non-overlapping, conventional threshold array. Finally, the 11, 3 screen will need a 14 by 14 or 196 element threshold array, compared to 130 by 130 or 16,900 elements with non-overlapping, conventional arrays.

The reduction in threshold array size is achieved at the expense of a more complex address determination required to map each pixel in device space to a specific element in the threshold array.

The system 20 correctly maps a device pixel in accordance with an overlapping threshold array in hardware for the entire device space, using a single halftone screen. A device output pixel value is determined by comparing the corresponding threshold array pixel value with the desired brightness level. If the desired brightness is less than the threshold array pixel value, the device pixel is turned off; otherwise, the pixel is turned on.

The top extreme left pixel in the device space is mapped to the top extreme left location in the threshold array. The halftoning is carried out row by row, starting with the extreme left device pixel in each row. The mapping between pixels in device space and the corresponding threshold array pixels may be broadly categorized into two steps:

1) Map the starting device pixel for the next row based on the starting device pixel for the current row; and 2) Map the next horizontal device pixel based on the current device pixel location.

The following dimensions and definitions are used to illustrate the inventive method, and are illustrated in FIG. 5 with respect to a tiled screen 60 (shown in oblique orientation), and an overlapping threshold array 62 (shown in vertical orientation):

w is the width of the threshold array;

h is the height of the threshold array; and

A and B are the rational tangent coefficients for the screen.

A specific element in the threshold array 62 can be referred to as t(i,j), where:

| i is the threshold column, | $0 \leq i \leq (w-1)$; and |
| j is the threshold row, | $0 \leq j \leq (h-1)$. |

The top extreme left element is referred to as t(0,0).

The tiling overlap in the horizontal and vertical directions, respectively, are expressed as:

$$O_h = w - A;$$

$$O_v = B.$$

Referring now to FIG. 6, mapping of the next horizontal device pixel is described. As long as elements of the threshold array are within the same tile of the threshold array in device space, an adjacent pixel in device space may be mapped to an adjacent pixel in the threshold array. This is true for both overlapping and non-overlapping threshold arrays. Thus, the next horizontal device pixel is mapped to the next horizontal pixel in the threshold array, as long as the current threshold location being mapped is not the last horizontal location in the threshold array. In the event that the current threshold pixel location is the last horizontal pixel location in the threshold array, a threshold array location in the adjacent tile of the threshold array in device space is taken into consideration. In a non-overlapping configuration, where the right side of the threshold array adjoins the left side and the bottom side adjoins the top side (a toroid in topology terms), the last horizontal pixel location in the threshold array is simply the first location in the same row of the threshold array. If the threshold arrays are "tiled" with overlap in device space, determination of the threshold array location becomes more complicated.

As illustrated in FIG. 6, tiles a, b and c, in device space, are used to determine overlapping threshold arrays 70 (shown in vertical orientation). When elements of the threshold array leave tile a (i.e., $\sim i_a = w-1$), the elements enter tile b or tile c depending on which row in tile a the array elements are currently on ($j_a$). In fact, for some rows the array elements may either enter tile b or tile c. A preferred method entails introducing the elements of the array in tile b when possible, otherwise in tile c. This translates to the following decisions:

if $j_a \leq ((h-1) - O_v)$ then enter tile b at $i_b = O_h$, $j_b = j_a + O_v$;

if $j_a > ((h-1) - O_v)$ then enter tile c at $i_c = 0$, $j_c = j_a - (h - O_v) + O_v$, where $O_h$ and $O_v$ represent the tile overlap in horizontal and vertical directions, respectively.

As a check, it should be noted that when there is no overlap ($O_h = O_v = 0$), the prior decisions reduce to the following result:

if $j_a \leq (h-1)$ then enter tile b at $i_b = 0$, $j_b = j_a$;

The mapping of the next horizontal pixel is then determined by the following considerations:

| if (i≤(w−1)): | next (i,j)=(i+1, j) |
| else if (j≤(h−1)−O$_v$): | next (i,j)=(O$_h$,j+O$_v$) |
| else | next (i,j)=(0,j−(h−O$_v$)+O$_v$). |

Referring now to FIG. 7, mapping of the starting device pixel for the next row is described. Mapping the starting device pixel for the next row is similar to mapping the next horizontal device pixel. If the elements of the threshold array are within the same tile of the threshold array (i.e., if the current row's starting device pixel is not mapped to the last row in the threshold array), the threshold array row is simply incremented and the column is kept the same. If the starting device pixel of the current row of the threshold array is mapped to the last vertical pixel location in the threshold array, a threshold array location in the adjacent tile of the threshold array in device space may be considered. In the simple non-overlapping configuration, the threshold array location in the adjacent tile of the threshold array in device space is simply the first row in the same column of the threshold array. If the threshold arrays are "tiled" with overlap in device space, determination of the threshold array location becomes more complicated.

As illustrated in FIG. 7, tiles a, b and c, in device space, are used to determine overlapping threshold arrays 80

(shown in vertical orientation). When the elements of the threshold array leave tile a (i.e., $j_a$=h), the elements enter tile b or tile c depending on which column in tile a the array elements are currently located on ($i_a$). In fact, for some columns, the array elements are introduced in either tile b or tile c. This may be carried out by following a simple rule where the elements are introduced in tile b when possible, otherwise in tile c. This translates to the following decisions:

if $i_a$>($O_h$−1) then enter tile b at $i_b$=$i_a$−$O_h$, $j_b$=$O_v$;

if $i_a$≦($O_h$−1) then enter tile c at $i_c$=$i_a$+(w−$O_h$)−$O_h$, $j_c$=0, where $O_h$ and $O_v$ represent the tile overlap in the horizontal and vertical directions, respectively.

As a check, it should be noted that when no overlap exists ($O_h$=$O_v$=0), the above decisions reduce to the following result:

$i_a$>0=>enter tile b at $i_b$=$i_a$, $j_b$=0.

The mapping of the next vertical pixel may then be determined by the following considerations:

| | |
|---|---|
| if (j≦h−1): | next (i,j)=(i,j+1) |
| else if (i>$O_h$−1): | next (i,j)=(i−$O_h$,$O_v$) |
| else: | next (i,j)=(i+(w−$O_h$)−$O_h$,0). |

Figure 8A:
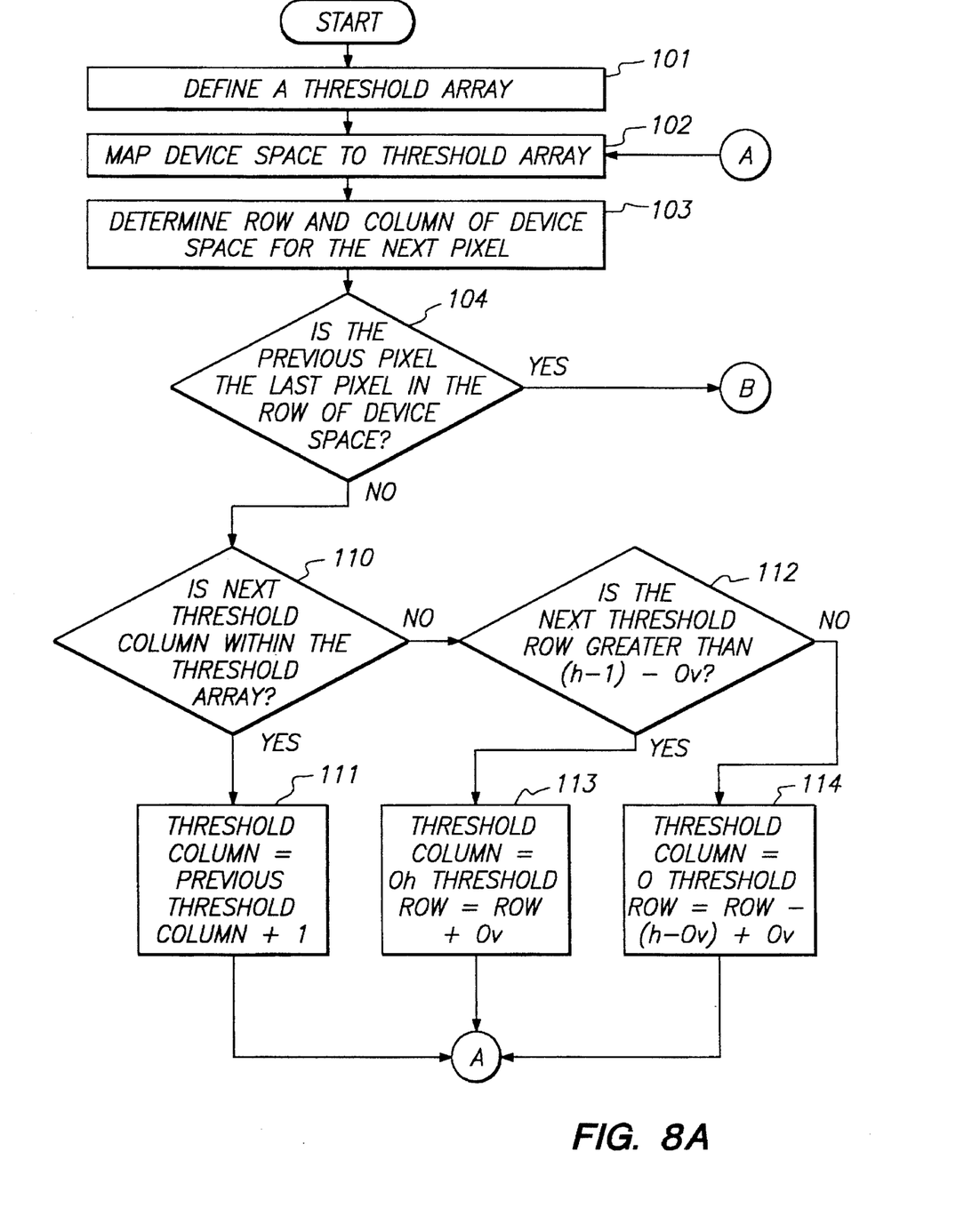
FIGS. 8A and 8B are a flowchart of the preferred method of performing halftoning using an overlapping threshold array according to the present invention.
Figure 8B:
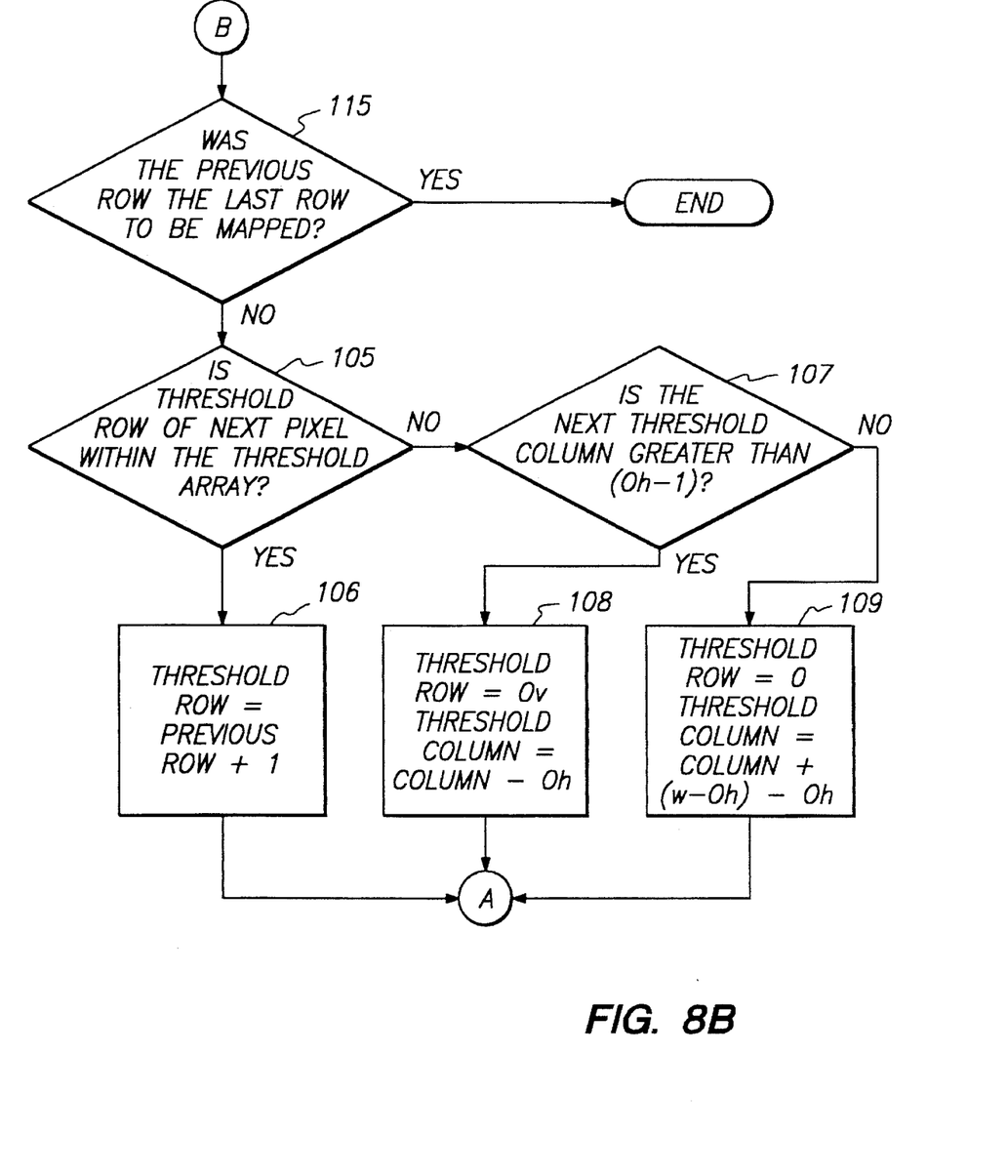

Referring now to FIGS. 8A and 8B, a flowchart of a preferred method for performing halftoning with an overlapped threshold array is shown. The method begins in step 101 by defining a halftone cell and the smallest threshold array according to the present invention. The method in step 101 creates the threshold array for at least one halftone cell and portions of a second. From the screen angle input the values of A and B are either known or can be easily calculated. Using the input values for A and B, the method also determines the values of h, w, $O_v$ and $O_h$. The height (h) and width (w) of the threshold array are known values once the threshold array has been created. Similarly, the values of tile overlap in the vertical ($O_v$) and horizontal ($O_h$) directions are also known once the threshold array has been defined. Next in step 102, the method of the present invention maps the device space to the threshold array. For the first pixel this is done by mapping the extreme upper left pixel of device space to the upper and left most point t(0,0) in the threshold array. Then in step 103, the method determines a row and a column in device space for the next pixel. Next in step 104, the method determines whether the previous pixel was the last pixel in the row of device space. If not the method continues in step 110. If so the method transitions to step 115 of FIG. 8B.

If it was determined in step 104 that the previous pixel was not the last pixel in the row of device space, the method continues in step 110. In step 110, the method determines the appropriate value within the threshold array that should be used to determine if the next pixel is on or off. The method of the present invention determines whether the threshold column of the next pixel is within the threshold array (i.e., is next column value <w−1). If it is, the pixel is within the same threshold array and the method continues in step 111. In step 111, the method uses a column value equal to the column value of the previous pixel plus one, and a row value that is the same as the row value of the previous pixel. Then the method proceeds to step 102 to map the pixel.

If the row of the next pixel is not within the threshold array as determined in step 110, the method continues in step 112 to make a further adjustment to transition from tile a to tile b or c. In step 112, the method tests whether the row value for the next pixel is greater than h minus one minus $O_v$. If the row value for the next pixel is greater than h minus one minus $O_v$, then the next pixel is in tile c and the method continues in step 113 by adjusting the threshold column value to be $O_h$, and the threshold row value to be the previous row value plus $O_v$. However, if it is determined that the threshold row value for the next pixel is not greater than h minus one minus $O_v$, then the mapping transitions to tile b, and the method adjusts the threshold column value to be 0 and the threshold row value to be equal to the row value of the previous pixel minus h plus 2*Ov in step 114. After either step 113 or step 114, the method continues in 102 to map the pixel.

If it was determined in step 104 that the previous pixel was the last pixel in the row of device space, the method continues in step 115 of FIG. 8B. In step 115, the method tests whether the previous row was the last row of device space to be mapped. If it is the method is complete and ends. If it is not the method continues in step 105. In step 105, the method determines the appropriate value within the threshold array that should be used to determine if the next pixel is on or off. The address in the threshold array can simply be adjusted to the coordinates of the next pixel just as in prior art halftoning methods except when the previous pixel was at the border of the threshold array. When the previous pixel was at the border of the threshold array, the location of the next pixel must be further adjusted because of the use of overlapping threshold arrays as has been described above. To provide this further adjustment, the method of the present invention determines whether the threshold row of the next pixel is within the threshold array (i.e., is next row value <h−1). If it is, the pixel is within the same threshold array and the method continues in step 106. In step 106, the method uses the row value equal to the row value of the previous pixel plus one, and a column value that is the same as the column value of the previous pixel. Then the method proceeds to step 102 to map the pixel.

If the threshold row of the next pixel is not within the threshold array, the method continues in step 107 to make a further adjustment to transition from tile a to tile b or c as noted above. In step 107, the method tests whether threshold column value for the next pixel is greater than $O_h$ minus one. If the threshold column value for the next pixel is greater than $O_h$ minus one, then the next pixel is in tile b and the method continues in step 108 by adjusting the threshold column value to be the previous column value minus $O_h$, and the threshold row value to be $O_v$. However, if it is determined that the threshold column value for the next pixel is not greater than $O_h$ minus one, then the mapping transitions to tile c, and the method adjusts the threshold row value to be 0 and the threshold column value to be equal to the column value of the previous pixel plus w minus 2*$O_h$ in step 109. After either step 109 or step 108, the method continues in step 102 to map the pixel.

Although the present invention has been described with reference to FIGS. 2–8, it should be understood that the figures are for illustration only and should not be taken as limitations upon the invention. It is contemplated that many changes and modifications may be made, by one of ordinary skill in the art, to the system and process of the invention without departing from the spirit and scope of the invention as disclosed above.

What is claimed is:

1. An apparatus for halftoning using an overlapping threshold array, said apparatus comprising:

an input port for receiving data to be printed with halftones, the input port having an input and an output, the output of the input port coupled to a bus;

a memory means for storing instructions and data, the memory means having an input and an output, the input and the output of the memory means coupled to the bus;

a central processing unit (CPU) for processing data from the input port and memory means using instructions from the memory means to form a data stream representative of an image, the CPU having inputs and outputs coupled to a bus;

a video processing unit having an input and an output for comparing the data stream from the CPU to a threshold array to produce pixel values, the input of the video processing unit coupled to the bus;

an output device having an input for receiving pixel values from the video processing unit into an image, the output device producing the image in visible form, the input of the output device coupled to the output of the video processing unit;

a FIFO buffer having an input and an output for storing the data stream used for forming the image, the input of the FIFO buffer coupled to the bus to receive data from the CPU, the output of the FIFO buffer coupled to the input of the video processing unit 34;

a plurality of registers having an input, an engine output and a video output for storing engine and video processing unit control signals, the input of the registers coupled to the bus, and the video output coupled to the input to the video processing unit; and an engine control unit having an input and an output, for controlling the halftoning and the printing of the output device and controlling the video processing unit, the input of the engine control unit coupled to the engine output of the registers, and the output of the engine control unit coupled to the output device and the video processing unit.

2. An apparatus for halftoning using an overlapping threshold array, said apparatus comprising:

an input port for receiving data to be printed with halftones, the input port having an input and an output, the output of the input port coupled to a bus:

a memory means for storing instructions and data, the memory means having an input and an output, the input and the output of the memory means coupled to the bus, the memory means including random access memory that stores control signals, masking values, color variance values, a threshold array and video modulation values;

a central processing unit (CPU) for processing data from the input port and memory means using instructions from the memory means to form a data stream representative of an image, the CPU having inputs and outputs coupled to a bus;

a video processing unit having an input and an output for comparing the data stream from the CPU to a threshold array to produce pixel values, the input of the video processing unit coupled to the bus, the video processing unit including threshold logic for addressing the threshold array and applying the values in the threshold array to the data stream, said threshold logic including means for overlapping the threshold array; and an output device having an input for receiving pixel values from the video processing unit into an image, the output device producing the image in visible form, the input of the output device coupled to the output of the video processing unit.

3. A method for representing a halftone screen existing in device space and comprising identical replicated halftone cells, with a threshold array addressable by rows and columns, said method comprising the steps of:

selecting a portion of said halftone screen for representation by said threshold array such that said threshold array has a side equal to the sum of the rational tangent coefficients for said halftone screen; and replicating said threshold array and overlapping portions of said threshold array over device space.

4. The method according to claim 3, additionally comprising the step of mapping a pixel in said device space for a row of said threshold array based on a pixel in said device space corresponding to a previous row of said threshold array.

5. The method according to claim 3, additionally comprising the step of mapping a pixel in said device space for a row of said threshold array based on an immediately preceding pixel on said row of said threshold array.

6. The method according to claim 3, additionally comprising the step of mapping a pixel in said device space for a column of said threshold array based on a pixel in said device space corresponding to a previous column of said threshold array.

7. The method according to claim 3, additionally comprising the step of mapping a pixel in said device space for a column of said threshold array based on an immediately preceding pixel in said column of said threshold array.

8. The method according to claim 3, wherein said step of replicating said threshold array further comprises the step of:

overlapping said threshold array in the horizontal direction by an amount equal to the difference between the width of said threshold array and said rational tangent coefficient in the horizontal direction.

9. The method according to claim 3, wherein said step of replicating said threshold array further comprises the step of overlapping said threshold array in the vertical direction by an amount equal to said rational tangent coefficient in the vertical direction.

10. A method for performing halftoning for printed images using an overlapping threshold array, said method comprising the steps of:

defining a halftone cell and a minimal threshold array;

mapping the threshold array over device space;

determining a row and a column in the threshold array for a previous pixel of the image that has been rendered to device space;

determining whether the next pixel is within the threshold array used for the previous pixel;

adjusting the mapping to account for overlapping threshold arrays if the next pixel is not within the threshold array used for the previous pixel; and performing halftoning using the adjusted mapping.

11. The method of claim 10 wherein the step of defining a halftone cell and a minimal threshold array includes forming a threshold array having sides equal to the sum of the rational tangent coefficients for the halftone screen and wherein the array comprises one complete halftone cell.

12. The method of claim 10 wherein the step of mapping the threshold array over device space begins by mapping the top extreme left pixel in device space to the top extreme left location in the threshold array.

13. The method of claim 10 wherein the step of performing halftoning using the adjusted mapping is carried out row by row from a first row and starting with the extreme left device pixel in each row.

14. The method of claim 10 wherein the step of determining whether the next pixel is within the threshold array further comprises the steps of:

determining whether the next pixel is vertically adjacent to the pixel that was previously mapped to device space; and determining whether the row of the next pixel is within the threshold array.

15. The method of claim 14 wherein the step of adjusting the mapping to account for overlapping threshold arrays further comprises the steps of:

using the same column value as the previous pixel and a row value of the previous row value plus one for threshold mapping if the pixel is within the threshold array for the previous pixel;

using a row value of a vertical overlap of the threshold arrays and a column value of the previous column value minus a horizontal overlap of the threshold arrays for threshold mapping, if the pixel is not within the threshold array for the previous pixel and the column value for the next pixel before adjustment is greater than the horizontal overlap of the threshold arrays; and using a row value of zero and a column value of the previous column value plus the width of the threshold array minus two times the horizontal overlap of the threshold arrays for threshold mapping, if the pixel is not within the threshold array for the previous pixel and the column value for the next pixel before adjustment is not greater than the horizontal overlap of the threshold arrays.

16. The method of claim 10 wherein the step of determining whether the next pixel is within the threshold array further comprises the steps of:

determining whether the next pixel is horizontally adjacent to the pixel that was previously mapped to device space; and determining whether the column of the next pixel is within the threshold array.

17. The method of claim 16 wherein the step of adjusting the mapping to account for overlapping threshold arrays further comprises the steps of:

using the same row value as the previous pixel and a column value of the previous column value plus one for threshold mapping if the pixel is within the threshold array for the previous pixel;

using a row value of the previous row value plus a vertical overlap of the threshold arrays, and a column value of the horizontal overlap of the threshold arrays, for threshold mapping, if the pixel is not within the threshold array for the previous pixel and the row value for the next pixel before adjustment is greater than the height of the threshold array minus the vertical overlap of the threshold arrays; and using a row value of the previous row value minus the height of the threshold array plus two times the vertical overlap of the threshold arrays, and a column value of zero, for threshold mapping, if the pixel is not within the threshold array for the previous pixel and the row value for the next pixel before adjustment is not greater than the height of the threshold array minus the vertical overlap of the threshold arrays.

18. A method for representing a halftone screen existing in device space and comprising identical replicated halftone cells with a threshold array addressable by rows and columns, said method comprising the steps of:

selecting a portion of said halftone screen for representation by said threshold array such that said threshold array has a first side equal to a first sum of a first rational tangent coefficient for said halftone screen multiplied by a first factor and a second rational tangent coefficient for said halftone screen multiplied by a second factor, and a second side equal to a second sum of the first rational tangent coefficient multiplied by the second factor and the second rational tangent coefficient multiplied by the first factor; and replicating said threshold array and overlapping portions of said threshold array over device space.

19. The method according to claim 18, wherein the first factor and the second factor are integers greater than zero.

20. The method according to claim 18, wherein the first factor and the second factor are equal to one.

\* \* \* \* \*